United States Patent
Huang et al.

(10) Patent No.: US 8,107,406 B2
(45) Date of Patent: Jan. 31, 2012

(54) OFFLINE MOBILE RFID EVENT PERSISTENCY AND SYNCHRONIZATION

(75) Inventors: Qiming Huang, Palo Alto, CA (US); Honghao Zhou, Shenzhen (CH)

(73) Assignee: Oracle International Corporation, Redwood Shores, CA (US)

( * ) Notice: Subject to any disclaimer, the term of this patent is extended or adjusted under 35 U.S.C. 154(b) by 925 days.

(21) Appl. No.: 12/123,727

(22) Filed: May 20, 2008

(65) Prior Publication Data

US 2009/0291668 A1 Nov. 26, 2009

(51) Int. Cl.
*H04B 7/00* (2006.01)
*H04W 4/00* (2009.01)
*H04J 3/06* (2006.01)
*H04H 20/71* (2008.01)

(52) U.S. Cl. ............... 370/310.2; 370/338; 370/350; 455/3.01

(58) Field of Classification Search .......... 370/310–350; 455/1–3, 400–466
See application file for complete search history.

(56) References Cited

U.S. PATENT DOCUMENTS

| | | | |
|---|---|---|---|
| 7,685,226 B1 * | 3/2010 | Norton et al. | 709/201 |
| 7,764,191 B2 * | 7/2010 | Hall et al. | 340/12.51 |
| 2006/0049250 A1 * | 3/2006 | Sullivan | 235/385 |
| 2006/0081714 A1 * | 4/2006 | King et al. | 235/472.03 |
| 2008/0106416 A1 * | 5/2008 | Sullivan et al. | 340/572.2 |
| 2008/0297312 A1 * | 12/2008 | Moshfeghi | 340/10.1 |
| 2009/0051492 A1 * | 2/2009 | Diaz et al. | 340/10.1 |
| 2009/0184826 A1 * | 7/2009 | Kim | 340/572.4 |

* cited by examiner

*Primary Examiner* — Tri H Phan
(74) *Attorney, Agent, or Firm* — Kilpatrick Townsend & Stockton LLP

(57) ABSTRACT

In various embodiments, RFID events are pre-processes with filtering logic by a mobile interrogator/reader before being inserted into tables of a local relational database on the mobile device when the mobile device cannot otherwise communicate collected events to a centralized data hub. The RFID events are stored in a normalized format that provides a simple, efficient, and standard interface for persisting the RFID events such that local access from applications on the mobile device is provided.

18 Claims, 8 Drawing Sheets

OFFLINE MOBILE RFID EVENT PERSISTENCY AND SYNCHRONIZATION

BACKGROUND OF THE INVENTION

The present invention relates to industrial automation. More specifically, the present invention relates to offline mobile RFID event persistency and synchronization.

In general, Radio Frequency Identification (RFID) is a technology for labeling and auto-sensing the identity of any physical object. Lately, this technology has been widely applied in the industries of supply chain management, retail, asset management, life science and healthcare, manufacture WIP (Work-In-Process) part tracking, etc.

Typically, mobile RFID refers to the technology of building an RFID interrogator to the mobile or handheld devices for collecting data at any time in any place. This expands the collection of RFID data and object visibility to much larger areas. However, in locations without any network coverage, a mobile interrogator/reader cannot transmit the data to a backend server immediately after the collection.

Additionally, most mobile RFID applications attempt to compensate for offline data collecting by storing RFID events in local files on the mobile or handheld devices. For example, a mobile RFID reader may read the Electronic Product Code (EPC) from an RFID tag and generate an RFID event that includes the EPC, a timestamp, and the source of the event. The source of the RFID event may be the mobile reader and the antenna that read the tag (if more than one). However, there is no straightforward and efficient mechanism to search for certain identification data from these local files, as each mobile reader may use a different format to store offline RFID events. Also, the data stored in the files needs to be copied to the backend server when the mobile or handheld device is again connected to the network. This is a non-trivial and error-prone process due to the data integrity, filtering, uniqueness, and other requirements by a data hub collecting RFID data from multiple sources.

Accordingly, what is desired are improved methods and apparatus for solving the problems discussed above. Additionally, what is desired are improved methods and apparatus for reducing some of the drawbacks discussed above.

BRIEF SUMMARY OF THE INVENTION

The present invention relates to industrial automation. More specifically, the present invention relates to offline mobile RFID event persistency and synchronization.

In various embodiments, RFID events are pre-processes with filtering logic by a mobile interrogator/reader before being inserted into tables of a local relational database on the mobile device when the mobile device cannot otherwise communicate collected events to a centralized data hub. The RFID events are stored in a normalized format that provides a simple, efficient, and standard interface for local access from applications on the mobile device.

Additionally, when the mobile interrogator/reader re-connects to the common data hub, newly collected RFID events can be automatically synchronized to a centralized relational database without logging the same RFID event multiple times. The data synchronization process can be bi-directional, allowing metadata for controlling the applications running on the mobile device to be synchronized from the centralized data hub to the mobile device.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

Figure 1:
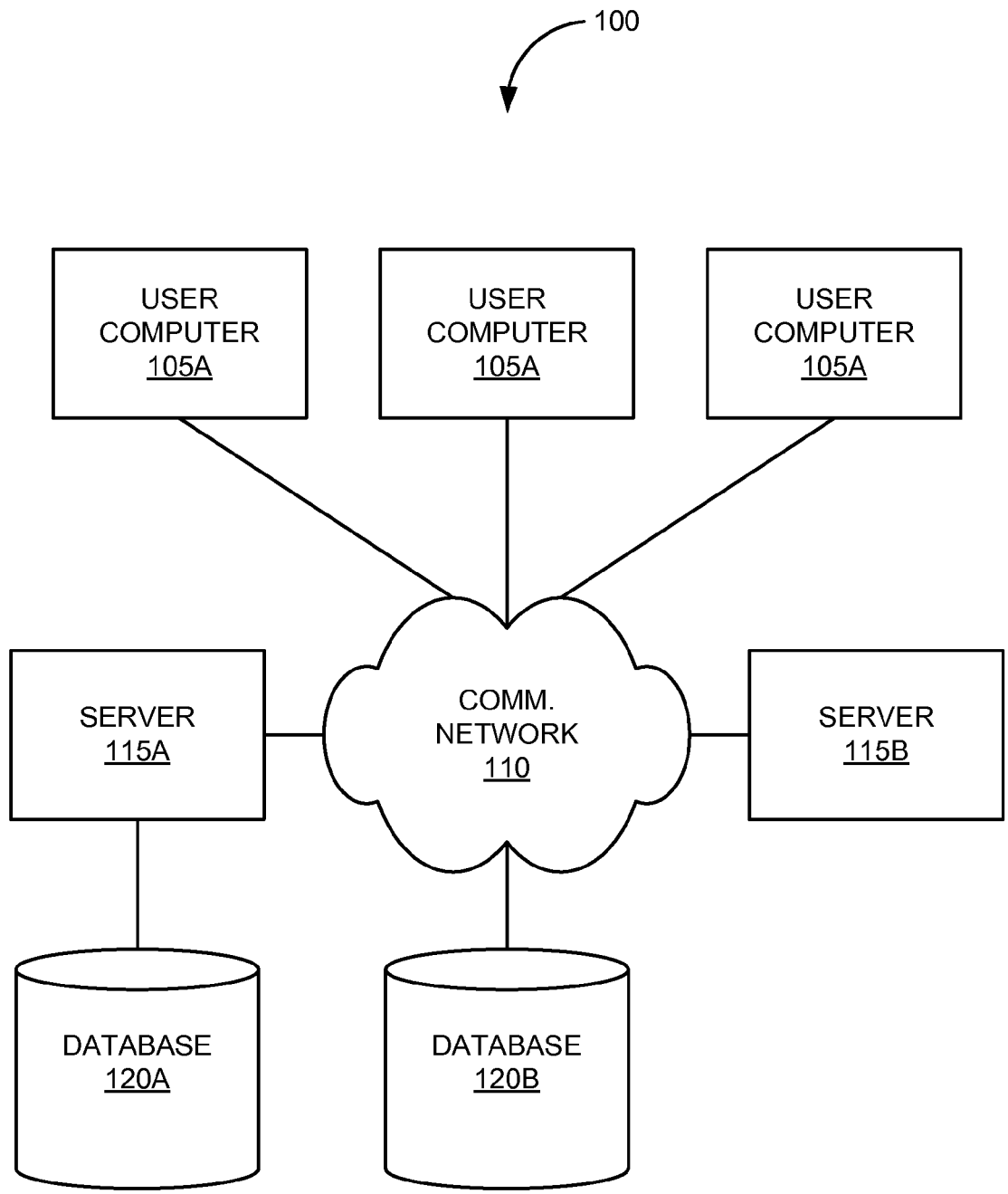
FIG. 1 is a block diagram of a system that may incorporate embodiments of the present invention.

FIG. 1 is a simplified illustration of system 100 that may incorporate embodiments of the present invention. FIG. 100 is merely illustrative of an embodiment incorporating the present invention and does not limit the scope of the invention as recited in the claims. One of ordinary skill in the art would recognize other variations, modifications, and alternatives.

In one embodiment, system 100 includes one or more user computers 105 (e.g., computers 105A, 105B, and 105C). User computers 105 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 105 can also have any of a variety of applications, including one or more applications configured to perform methods of the invention, as well as one or more office applications, database client and/or server applications, and web browser applications.

Alternatively, user computers 105 can be any other electronic device, such as a thin-client computer, Internet-enabled mobile telephone, and/or personal digital assistant, capable of communicating via a network (e.g., communications network 110 described below) and/or displaying and navigating web pages or other types of electronic documents. Although the exemplary system 100 is shown with three user computers, any number of user computers can be supported.

Certain embodiments of the invention operate in a networked environment, which can include a communications network 110. Communications network 110 can be any type of network familiar to those skilled in the art that can support data communications using any of a variety of commercially-available protocols, including without limitation TCP/IP, SNA, IPX, AppleTalk, and the like. Merely by way of example, communications network 110 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 115 (e.g., computers 115A and 115B). Each of server computers 115 may be configured with an operating system including without limitation any of those discussed above, as well as any commercially-available server operating systems. Each of server computers 115 may also be running one or more applications, which can be configured to provide services to one or more clients (e.g., user computers 105) and/or other servers (e.g., server computers 115).

Merely by way of example, one of server computers 115 may be a web server, which can be used, merely by way of example, to process requests for web pages or other electronic documents from user computers 105. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 105 to perform methods of the invention.

Server computers 115, in some embodiments, might include one or more file and or/application servers, which can include one or more applications accessible by a client running on one or more of user computers 105 and/or other server computers 115. Merely by way of example, one or more of server computers 115 can be one or more general purpose computers capable of executing programs or scripts in response to user computers 105 and/or other server computers 115, including without limitation web applications (which might, in some cases, be configured to perform methods of the invention).

Merely by way of example, a web application can be implemented as one or more scripts or programs written in any programming language, such as Java™, C, C™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from database clients running on one of user computers 105 and/or another of server computer 115.

In some embodiments, an application server can create web pages dynamically for displaying the information in accordance with embodiments of the invention. Data provided by an application server may be formatted as web pages (comprising HTML, XML, Javascript, AJAX, etc., for example) and/or may be forwarded to a user computer 105 via a web server (as described above, for example). Similarly, a web server might receive web page requests and/or input data from one of user computers 105 and/or forward the web page requests and/or input data to an application server.

In accordance with further embodiments, one or more of server computers 115 can function as a file server and/or can include one or more of the files necessary to implement methods of the invention incorporated by an application running on a user computer 105 and/or another server 115. Alternatively, as those skilled in the art will appreciate, a file server can include all necessary files, allowing such an application to be invoked remotely by one or more of user computers 105 and/or server computers 115. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 100 can include one or more databases 120 (e.g., databases 120A and 120B). The location of the database(s) 120 is discretionary: merely by way of example, a database 120A might reside on a storage medium local to (and/or resident in) server computer 115A (and/or one or more of user computers 105). Alternatively, a database 120B can be remote from any or all of user computers 105 and server computers 115, so long as it can be in communication (e.g., via communications network 110) with one or more of these. In a particular set of embodiments, databases 120 can reside in a storage-area network ("SAN") familiar to those skilled in the art. (Likewise, any necessary files for performing the functions attributed to user computers 105 and server computers 115 can be stored locally on the respective computer and/or remotely, as appropriate). In one set of embodiments, one or more of databases 120 can be a relational database, such as an Oracle database, that is adapted to store, update, and retrieve data in response to SQL-formatted commands. Databases 120 might be controlled and/or maintained by a database server, as described above, for example.

In various embodiments, RFID events are pre-processes with filtering logic by a mobile interrogator/reader before being inserted into tables of a local relational database on the mobile device when the mobile device cannot otherwise communicate collected events to a centralized data hub. The RFID events are stored in a normalized format that provides a simple, efficient, and standard interface for local access from applications on the mobile device.

Additionally, when the mobile interrogator/reader re-connects to the common data hub, newly collected RFID events can be automatically synchronized to a centralized relational database without logging the same RFID event multiple times. The data synchronization process can be bi-directional, allowing metadata for controlling the applications running on the mobile device to be synchronized from the centralized data hub to the mobile device.

Figure 2:
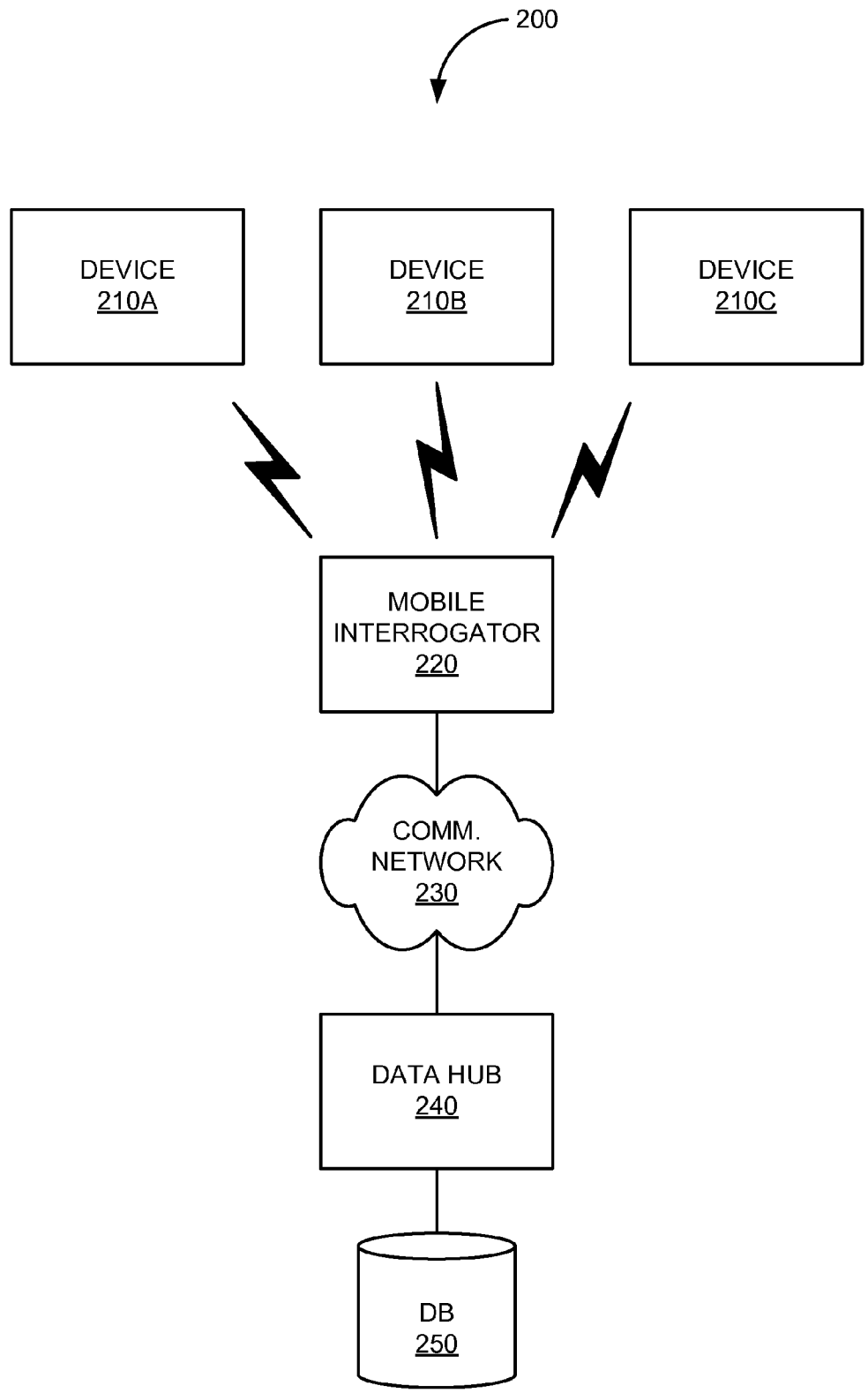
FIG. 2 is a block diagram of a system for providing RFID event persistency and synchronization in one embodiment according to the present invention.

FIG. 2 is a block diagram of system 200 for providing RFID event persistency and synchronization in one embodiment according to the present invention. In this example, system 200 includes devices 210 (e.g., devices 210A, 210B, and 210B). In general, information may be read or otherwise collected from devices 210. In some embodiments, devices 210 can be sensors that provide telemetry data, temperature sensors, humidity sensors, pressure sensors, voltage sensors, barcodes, contactless cards, RFID tags and labels, and the like.

In certain embodiments, data is collected from devices 210 using interrogator 220. Interrogator 220 is any hardware and/or software elements that collect data from devices 210. Interrogator 220 may be a fixed or mobile RFID reader. In various embodiments, interrogator 220 communicates data collected from devices 210 using communications network 230 to data hub 240.

Communications network 230 can be any type of network familiar to those skilled in the art that can support data communications using any of a variety of commercially-available protocols, including without limitation TCP/IP, SNA, IPX, AppleTalk, and the like. Merely by way of example, communications network 230 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

In various embodiments, data hub 240 is coupled to database 250. Data hub 240 is any hardware and/or software elements that receive data from interrogator 220. Data hub 240 may provide middleware and/or application support to access data stored in database 250. One example of data hub 240 is a server running Oracle Sensor Edge Server provided by Oracle Corp. of Redwood Shores, Calif. Some examples of database 250 are files, flat database, relational databases, and the like.

In operation, when devices 210 enter within the proximity of interrogator 220, devices 210 transmit data to interrogator 220. For example, device 210A may be a passive RFID label, an antenna (not shown) associated with interrogator 220 may energize circuitry of the passive RFID label such that the RFID label transmits data stored in a memory. In another example, device 210B may be an active RFID tag that continuously broadcasts data which may be intercepted by interrogator 220.

In general, interrogator 220 generates an RFID event based on the collected data. The RFID event may include the collected data, in addition to other metadata, such as a timestamp, a source or device identifier, and the like. Interrogator 220 may "filter" or pre-process the RFID event to smooth the data by throwing away previously detected information, or by using a mask-matching algorithm to route information to other components/applications based on the mask criteria.

When a connection is available, interrogator 220 forwards any RFID events to data hub 240. Data hub 240 may store the RFID events in database 250. In some embodiments, data hub 240 further processes the RFID events for storage into database 250.

In some embodiments, interrogator 220 locally stores RFID events when a connection is not available or when interrogator 220 cannot otherwise forward RFID events to data hub 240. Thus, RFID applications on interrogator 220 can persist and access the stored RFID events even without network connectivity.

Figure 3:
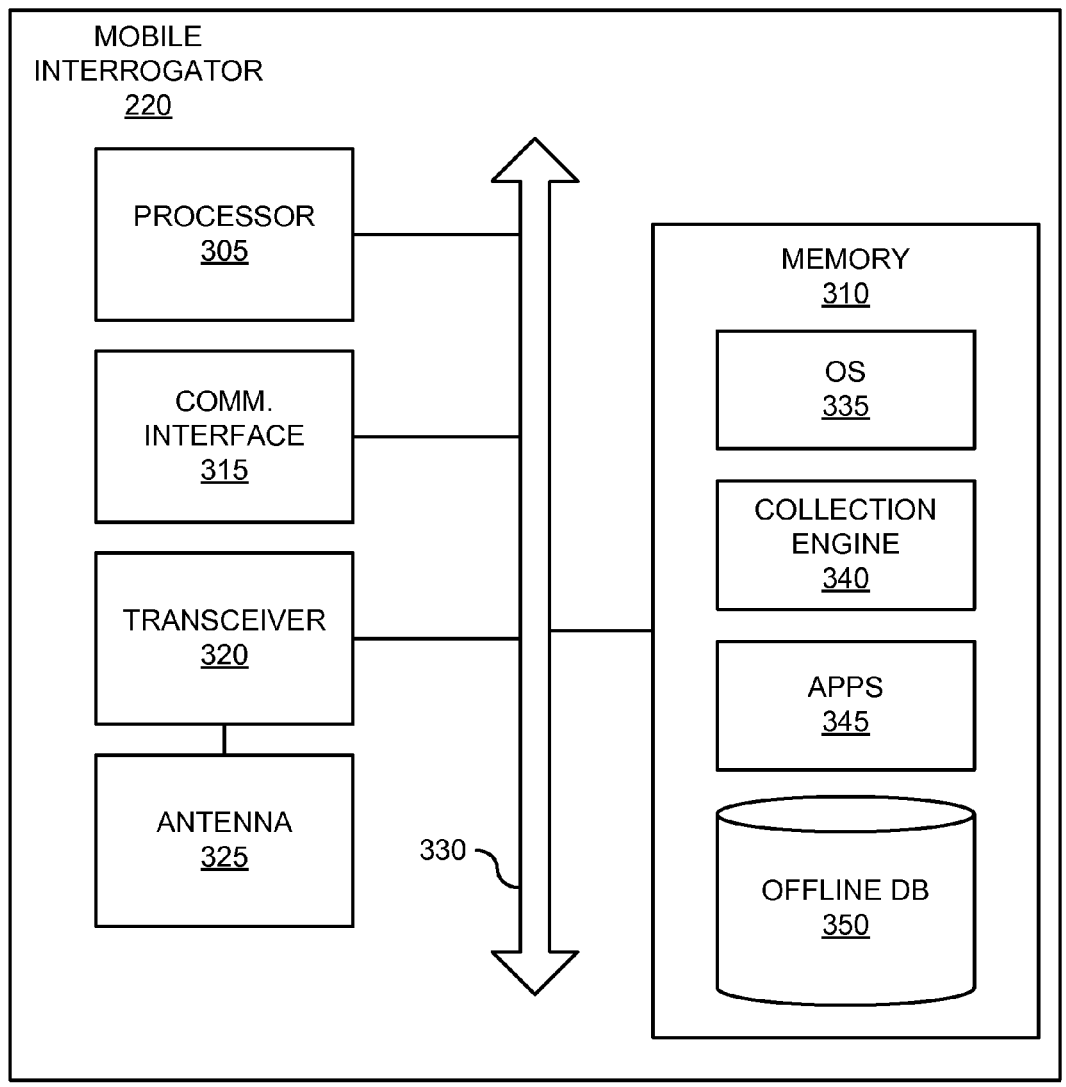
FIG. 3 is a block diagram of a mobile interrogator/reader in one embodiment according to the present invention.

FIG. 3 is a block diagram of mobile interrogator 220 of FIG. 2 in one embodiment according to the present invention. In this example, interrogator 220 includes processor 305, memory 310, communications interface 315, transceiver 320, antenna 325, and system bus 330. System bus 330 provides communications between processor 305, memory 310, communications interface 315, and transceiver 320.

In certain embodiments, memory 310 includes operating system (OS) 335, collection engine 340, applications 345, and offline database 350. Memory 310 may be configured to store instructions and/or code modules which when executed by processor 305 caused processor 305 to perform various functions, methods, operations, and the like.

In operation, mobile interrogator 220 collects data from remote devices using transceiver 320 when the remote devices are in proximity of antenna 325. Collection engine 340 generates RFID events based on the collected data. One example of collection engine 340 is Sensor Edge Mobile™ provided by Oracle Corp.

Mobile interrogator 220 may send RFID events to a centralized data hub via communications interface 315 (e.g., a wireless network interface). The RFID events may be sent immediately upon generation, or may be queued and sent in a batch. Applications 345 may access the RFID events, for example, to display read details and the like.

In some embodiments, the RFID events are stored in offline database 350. Collection engine 340 may pre-process the RFID events using filtering logic to store the RFID events in offline database 350 in a normalized format. One example of offline database 350 is Oracle Database Lite™ by Oracle Corp. Other relational and non-relational database may be used that are appropriate for embedded or mobile devices. Offline database 350 provides an interface for local data access, as well as management and data synchronization interfaces that communicate with another database (e.g., an online database).

When mobile interrogator 220 is connected to a network, a synchronization process can be triggered by a user or automatically from an application program. In various embodiments, only the newly collected RFID events are synchronized from offline database 350 to observation tables of a centralized relational database without logging the same RFID event multiple times. The data synchronization can be conducted bi-directionally. The metadata for controlling applications running on mobile interrogator 220 can be synchronized from the centralized database to offline database 350. In some embodiments, the newly collected RFID events stored in offline database 350 before data synchronization can remain in offline database 350 or be deleted from offline database 350 based on a user or device configuration.

Accordingly, applications on mobile interrogator 220 can persist and access mobile RFID events, even without network connectivity. The RFID events stored on mobile interrogator are cleansed and normalized, which reduces the size of the data to save valuable storage on mobile devices. Additionally, the RFID events persisted in offline database 350 are automatically synchronized up to any centralized database without ad-hoc manual or programmatic merging process.

Figure 4:
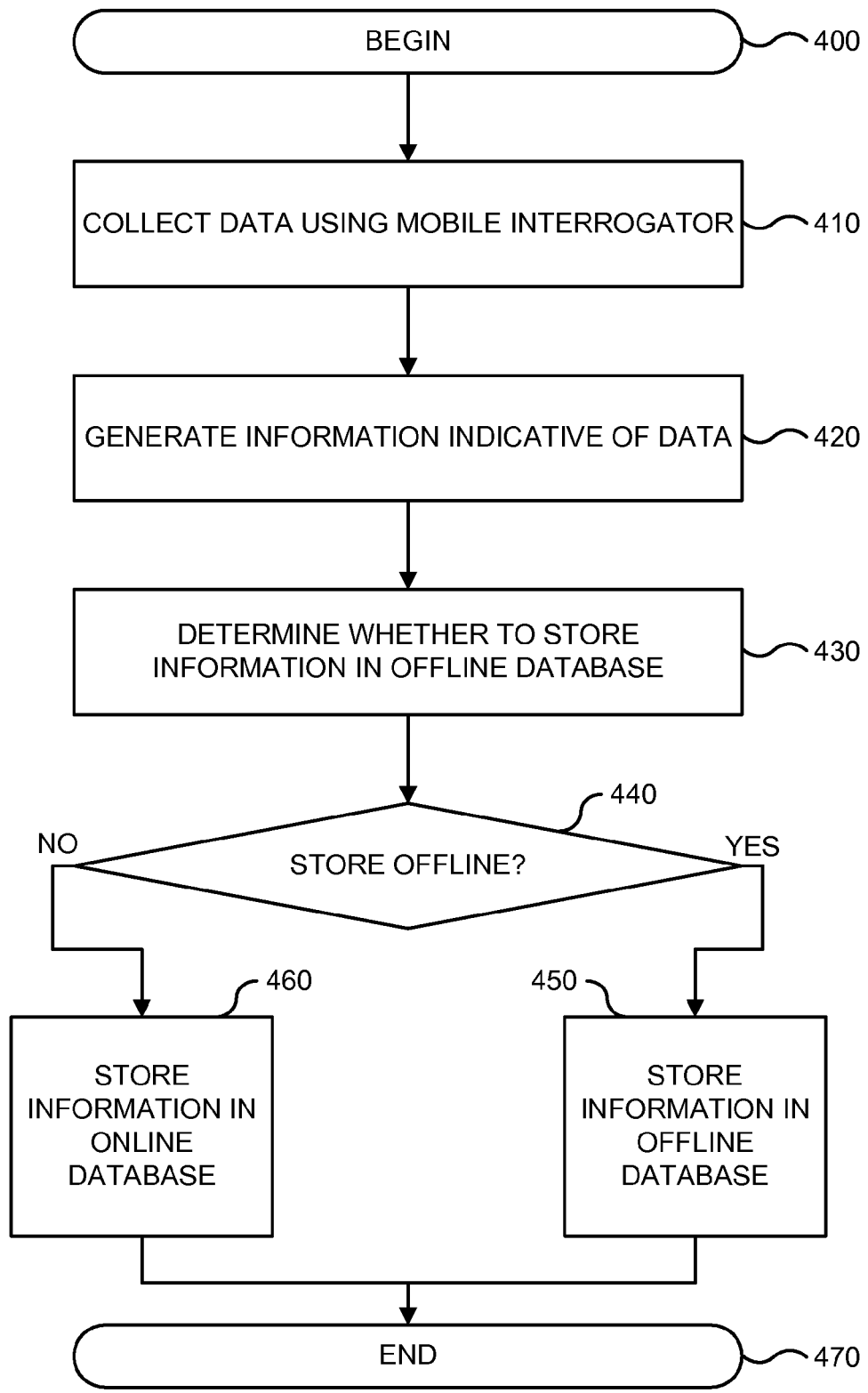
FIG. 4 is a flowchart of a method for persisting RFID events in one embodiment according to the present invention.

FIG. 4 is a flowchart of a method for persisting RFID events in one embodiment according to the present invention. FIG. 4 begins in step 400.

In step 410, data is collected using a mobile interrogator/reader. In step 420, information indicative of the data is generated. In one example, raw sensor data collected by a mobile reader is formatting into RFID events. The RFID events are pre-processed with filtering logic before being inserted into a database in a normalized data format.

In step 430, a determination is made whether to store the information in an offline database. For example, the mobile interrogator may determine whether a network connection or link is available. In another example, the mobile interrogator may determine whether to store the information in an offline database based on the time.

If the determination in step 440 is that the information should be stored in the offline database, in step 450, the information is then stored in the offline database. For example, the offline database may be a local database on the mobile interrogator. If the determination in step 440 is that the information should not be stored in the offline database, in step 460, the information is stored in an online database. For example, the information is transmitted from the mobile interrogator via a communications network to a data hub for storage in a database. FIG. 4 ends in step 470.

Figure 5:
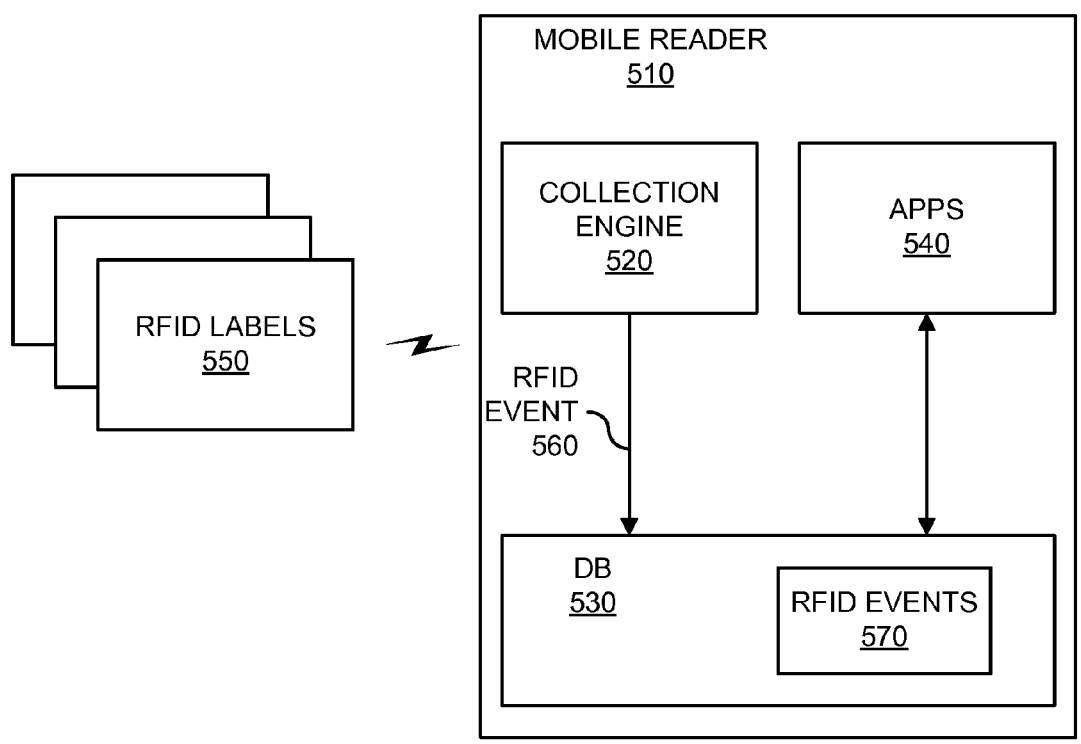
FIG. 5 is a block diagram illustrating a mobile reading in offline mode in one embodiment according to the present invention.

FIG. 5 is a block diagram illustrating mobile reading 510 in offline mode in one embodiment according to the present invention. In this example, mobile reader 510 includes collection engine 520, database 530, and applications 540. Mobile reader 510 collects data from RFID labels 550.

Collection engine 520 generates an RFID event 560 from the data collected from RFID labels 550. For example, collection engine 520 may format, filter, and normalize the collected data for storage as RFID events 570 in database 530. Applications 540 executing on mobile reader 510 may access RFID events 570 using database 530.

Accordingly, RFID events generated by mobile reader 510 are persisted in database 530 when no connection is available to a main repository. Moreover, since the RFID events have been pre-processed and normalized for storage in database 530, they are readily accessible and available for searching. In addition, when mobile reader 510 is connected to a main repository, the RFID events can be readily synchronized.

Figure 6:
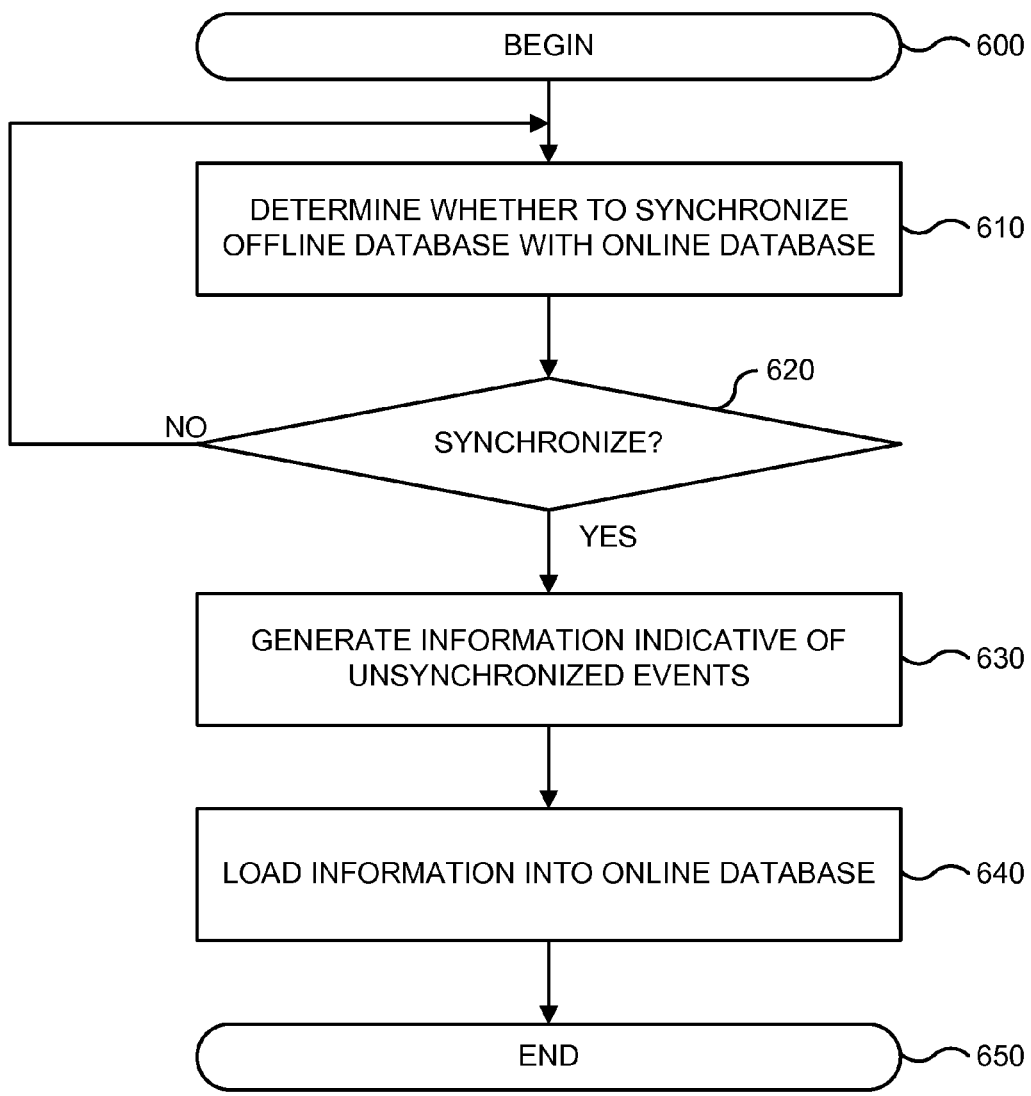
FIG. 6 is a flowchart of a method for synchronizing RFID events between an offline database and an online database in one embodiment according to the present invention.

FIG. 6 is a flowchart of a method for synchronizing RFID events between an offline database and an online database in one embodiment according to the present invention. FIG. 6 begins in step 600.

In step 610, a determination is made whether to synchronize an offline database with an online database. In one example, mobile reader 510 periodically checks whether a connection is available the online database. In another example, mobile reader 510 may determine to synchronize to the online database when network connectivity is restored.

If the determination in step 620 is that the offline database should not be synchronized with the online database, the process continues in step 610. If the determination in step 620 is that the offline database should be synchronized with the online database, in step 630, information indicative of unsynchronized events is generated. In step 640, the information is loaded into the online database.

Accordingly, in various embodiments, only the newly collected RFID events are synchronized from a mobile reader to the online database. The RFID events may remain in the offline database or be removed. In some embodiments, the synchronization occurs bi-directionally. The metadata that controls applications on the mobile device or the mobile devices itself may be synchronized from the online database to the offline database.

Figure 7:
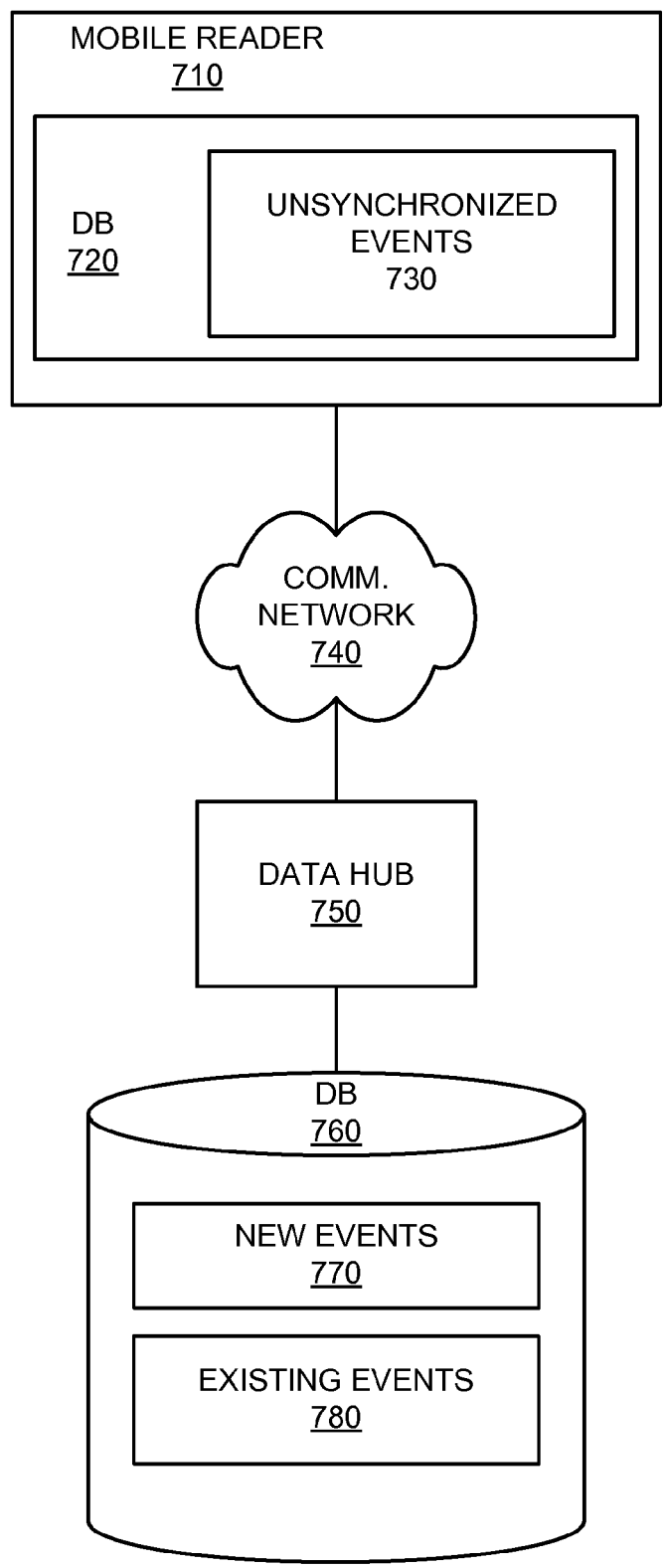
FIG. 7 is a block diagram illustrating a mobile reader in online mode for syncing in one embodiment according to the present invention.

FIG. 7 is a block diagram illustrating mobile reader 710 in online mode for syncing in embodiment according to the present invention. In this example, mobile reader 710 includes database 720 (e.g., an offline database) storing unsynchronized events 730. Upon determining to synchronize any RFID events persisted in database 720, mobile reader 710 transmits unsynchronized events 730 via communications network 740 to data hub 740.

Data hub 750 stores unsynchronized events 730 in database 760 (e.g., online database). Database 760 includes new events 770 (e.g., the newly received unsynchronized events 730) and existing events 780.

Figure 8:
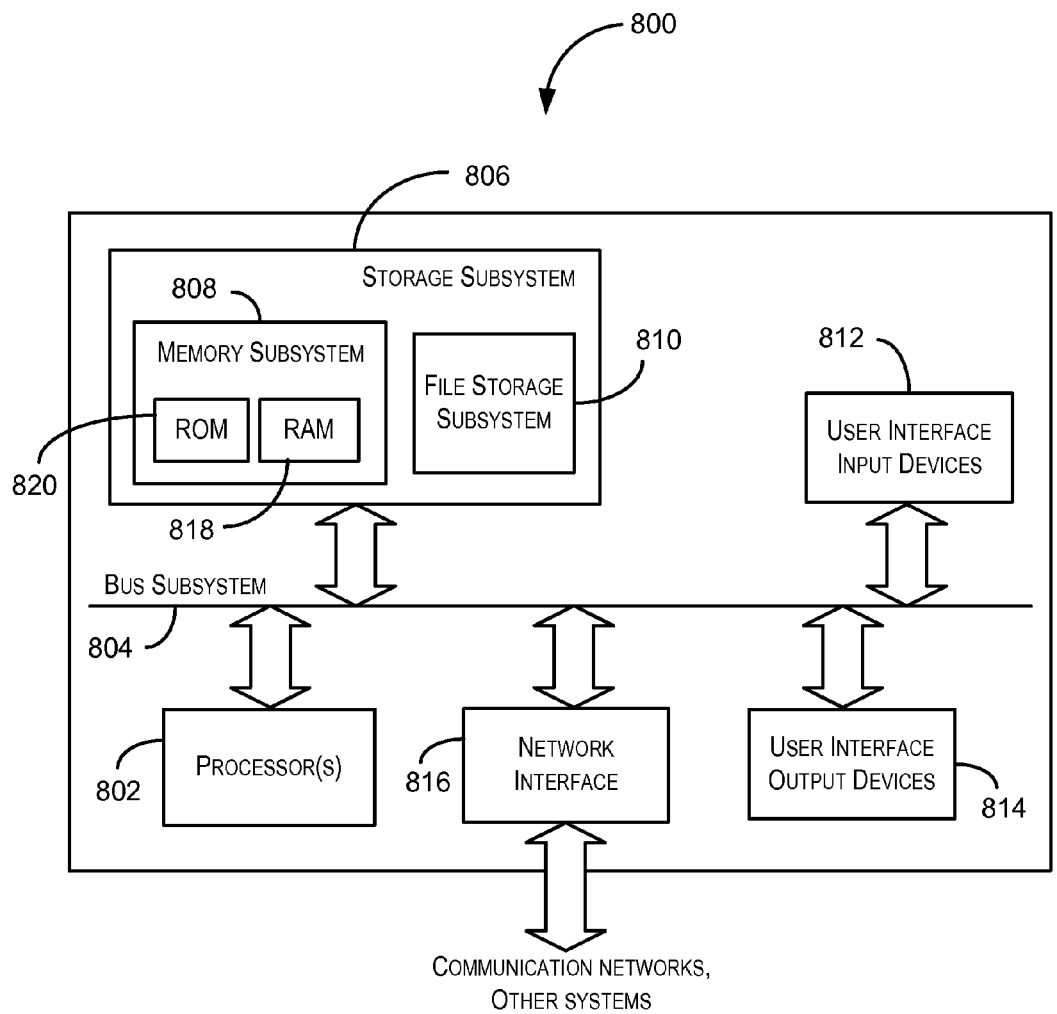
FIG. 8 is a block diagram of a computer system that may be used to practice embodiments of the present invention.

FIG. 8 is a simplified block diagram of a computer system 800 that may be used to practice embodiments of the present invention. As shown in FIG. 8, computer system 800 includes a processor 802 that communicates with a number of peripheral devices via a bus subsystem 804. These peripheral devices may include a storage subsystem 806, comprising a memory subsystem 808 and a file storage subsystem 810, user interface input devices 812, user interface output devices 814, and a network interface subsystem 816.

Bus subsystem 804 provides a mechanism for letting the various components and subsystems of computer system 800 communicate with each other as intended. Although bus subsystem 804 is shown schematically as a single bus, alternative embodiments of the bus subsystem may utilize multiple busses.

Network interface subsystem 816 provides an interface to other computer systems, and networks, and devices. Network interface subsystem 816 serves as an interface for receiving data from and transmitting data to other systems from computer system 800.

User interface input devices 812 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 800.

User interface output devices 814 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 800.

Storage subsystem 806 may be configured to store the basic programming and data constructs that provide the functionality of the present invention. Software (code modules or instructions) that provides the functionality of the present invention may be stored in storage subsystem 806. These software modules or instructions may be executed by processor(s) 802. Storage subsystem 806 may also provide a repository for storing data used in accordance with the present invention. Storage subsystem 806 may comprise memory subsystem 808 and file/disk storage subsystem 810.

Memory subsystem 808 may include a number of memories including a main random access memory (RAM) 818 for storage of instructions and data during program execution and a read only memory (ROM) 820 in which fixed instructions are stored. File storage subsystem 810 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Computer system 800 can be of various types including a personal computer, a portable computer, a workstation, a network computer, a mainframe, a kiosk, or any other data processing system. Due to the ever-changing nature of computers and networks, the description of computer system 800 depicted in FIG. 8 is intended only as a specific example for purposes of illustrating the preferred embodiment of the computer system. Many other configurations having more or fewer components than the system depicted in FIG. 8 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method for accessing data, the method comprising:
   receiving metadata at a mobile device based on a determination to synchronize RFID events stored in an offline database on the mobile device, the metadata indicative of how to normalize data collected from one or more RFID readers;
   generating an RFID event at the mobile device based on the metadata configuring one or more applications on the mobile device;
   determining whether to store the RFID event on the mobile device in the offline database or in an online database on a server;
   determining whether to synchronize RFID events stored in the offline database on the mobile device with the online database on the server; and
   updating the online database on the server with the RFID event.

2. The method of claim 1 further comprising:
   storing the RFID event in the offline database on the mobile device.

3. The method of claim 1 further comprising:
   accessing the RFID event using an application on the mobile device when the mobile device is offline.

4. The method of claim 1 wherein determining whether to store the RFID event on the mobile device comprises determine whether a link exists between the mobile device and the server.

5. The method of claim 1 wherein determining whether to synchronize RFID events stored on the mobile device with a server comprises detecting a link between the mobile device and the server.

6. The method of claim 1 wherein updating the online database on the server with the RFID event comprises synchronizing the offline database on the mobile device with the online database on the server.

7. A non-transitory computer readable medium configured to store a set of code modules which when executed by a processor become operational with the processor for accessing data, the non-transitory computer readable medium comprising:
   code for receiving metadata at a mobile device based on a determination to synchronize RFID events stored in an offline database on the mobile device, the metadata indicative of how to normalize data collected from one or more RFID readers;
   code for generating an RFID event at the mobile device based on the metadata configuring one or more applications on the mobile device;
   code for determining whether to store the RFID event on the mobile device in the offline database or in an online database on a server;
   code for determining whether to synchronize RFID events stored in the offline database on the mobile device with the online database on the server; and
   code for updating the online database on the server with the RFID event.

8. The non-transitory computer readable medium of claim 7 further comprising:
   code for storing the RFID event in the offline database on the mobile device.

9. The non-transitory computer readable medium of claim 7 further comprising:
   code for accessing the RFID event using an application on the mobile device when the mobile device is offline.

10. The non-transitory computer readable medium of claim 7 wherein the code for determining whether to store the RFID event on the mobile device comprises code for determine whether a link exists between the mobile device and the server.

11. The non-transitory computer readable medium of claim 7 wherein the code for determining whether to synchronize RFID events stored on the mobile device with a server comprises code for detecting a link between the mobile device and the server.

12. The non-transitory computer readable medium of claim 7 wherein the code for updating the online database on the server with the RFID event comprises code for synchronizing the offline database on the mobile device with the online database on the server.

13. A system for accessing data, the system comprising:
   a mobile device configured to:
      receive metadata based on a determination to synchronize RFID events stored in an offline database on the mobile device, the metadata indicative of how to normalize data collected from one or more RFID readers,
      generate an RFID event based on the metadata configuring one or more applications on the mobile device,
      determine whether to store the RFID event in a local relational database on the mobile device, and
      determine whether to synchronize RFID events stored on the mobile device with a centralized relational database; and
   a server configured to update the centralized relational database on the server with the RFID event.

14. The system of claim 13 further comprising:
   one or more applications configured to access the RFID event on the mobile device when the mobile device is offline.

15. The system of claim 13 wherein the mobile device is configured to determine whether a link exists between the mobile device and the server to determine whether to store the RFID event on the mobile device.

16. The system of claim 13 wherein the mobile device is configured to detecting a link between the mobile device and the server to determine whether to synchronize RFID events stored on the mobile device with a server.

17. The system of claim 13 wherein updating the database on the server with the RFID event comprises synchronizing an offline database on the mobile device with the online database on the server.

18. A non-transitory computer readable medium configured to store a set of code modules which when executed by a processor become operational with the processor for providing persistence to RFID events, the non-transitory computer readable medium comprising:
   code for storing RFID events generated by a wireless RFID reader in a local relational database on the wireless RFID reader;

code for determining whether one or more conditions are present that enable to the wireless RFID reader to wirelessly exchange data with a centralized relational database;

code for determining, based on whether the one or more conditions are present, whether one or more applications on the wireless RFID reader access RFID events stored using the local relational database or stored using the centralized relational database;

code for transferring RFID events as stored in the local relational database to the centralized relational database.

* * * * *

UNITED STATES PATENT AND TRADEMARK OFFICE
CERTIFICATE OF CORRECTION

PATENT NO. : 8,107,406 B2  
APPLICATION NO. : 12/123727  
DATED : January 31, 2012  
INVENTOR(S) : Huang et al.

Page 1 of 1

It is certified that error appears in the above-identified patent and that said Letters Patent is hereby corrected as shown below:

In column 3, line 37, delete "and or/application" and insert -- and/or application --, therefor.

In column 3, line 49, delete "C™" and insert -- $C^{\#}$™ --, therefor.

In column 5, line 25, delete "Oracle" and insert -- Oracle™¬ --, therefor.

Signed and Sealed this
First Day of May, 2012

David J. Kappos
*Director of the United States Patent and Trademark Office*